INVENTORS
E. N. FULLER
B. O. AYERS
BY
Young & Quigg
ATTORNEYS

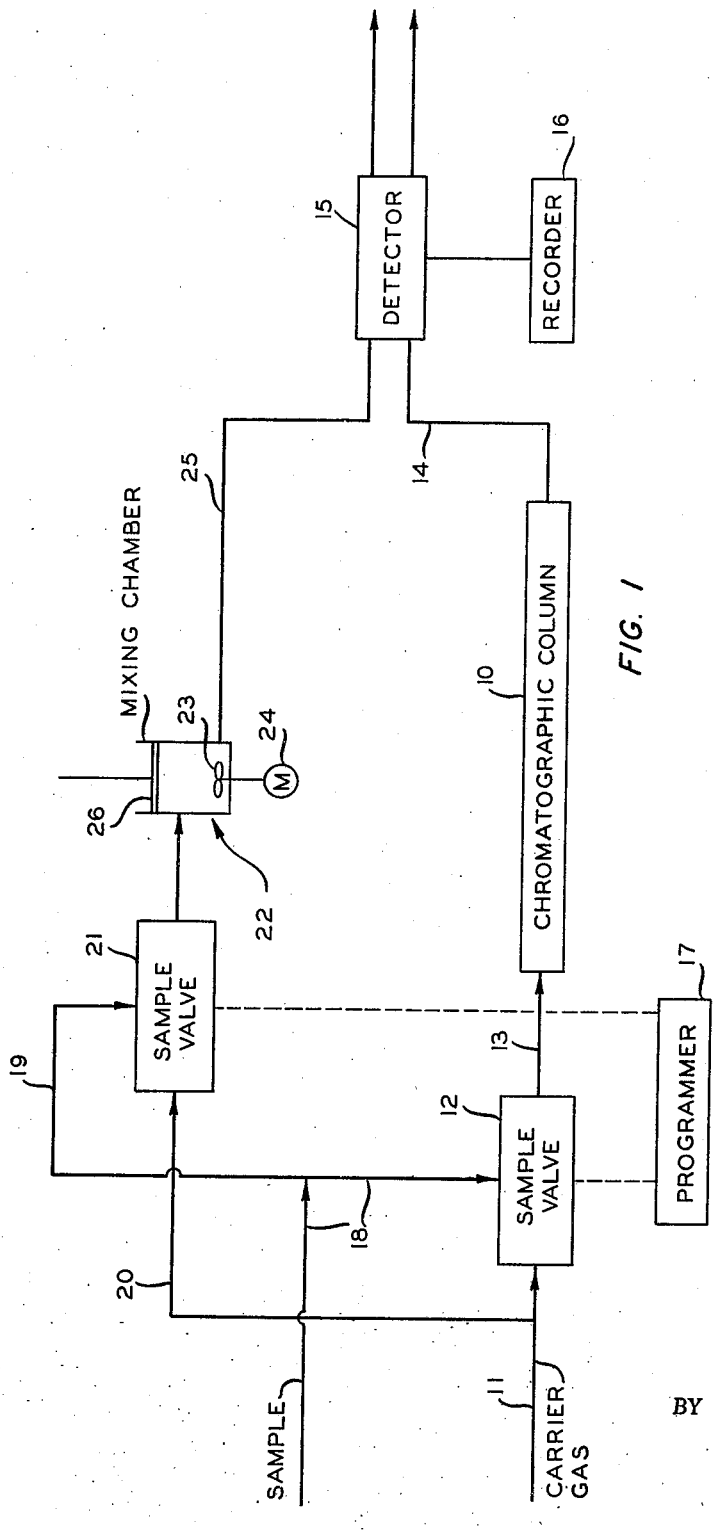
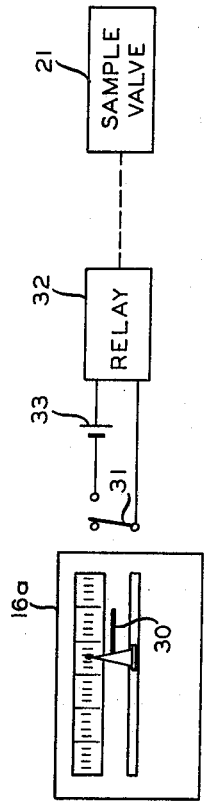

United States Patent Office 3,498,106
Patented Mar. 3, 1970

3,498,106
CHROMATOGRAPHIC ANALYSIS
Edward N. Fuller and Buell O. Ayers, Bartlesville, Okla., assignors to Phillips Petroleum Company, a corporation of Delaware
Filed July 20, 1967, Ser. No. 654,771
Int. Cl. G01n *31/08*
U.S. Cl. 73—23.1                               8 Claims

---

ABSTRACT OF THE DISCLOSURE

The trailing edge of a peak in a chromatogram is eliminated by use of a differential detector and the introduction of diminishing amounts of a reference material into the reference channel of the detector to balance out the trailing edge.

---

Figure 2A:
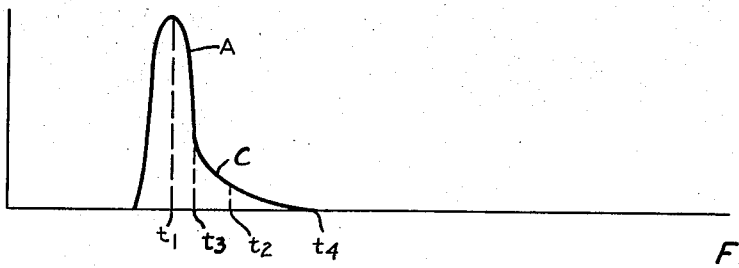

This invention relates to an improved method of resolving peaks in chromatographic analysis.

In recent years it has become common practice to analyze various types of samples by chromatographic analysis. However, it is often difficult to resolve the individual peaks in the record, particularly when a peak which represents a small volume sample constituent appears on the trailing edge of a peak which represents a major constituent. The trailing edge may tend to mask the smaller peak.

In accordance with this invention a method is provided for distinguishing between individual constituents, even when these constituents occur in closely spaced relationship in the column effluent. This is accomplished by the use of a differential sample detector. The chromatographic column effluent is directed to one channel of the detector and carrier gas alone flows initially through the second channel of the detector. The normal trailing edge of a major constituent peak is effectively eliminated from the detector output by introducing a reference material into the second carrier gas stream at the time that the trailing edge of the major constituent signal begins to appear. The amount of the material so added and the size of the introduction system can be varied so that the second signal balances the trailing edge of the primary signal and thus effectively eliminates the trailing edge from the record. In this manner, the second constituent can readily be detected without interference from the trailing edge of the first constituent.

Accordingly, it is an object of this invention to provide an improved method of resolving peaks in chromatographic analysis.

Another object is to provide novel chromatographic analysis apparatus.

Other objects, advantages and features of the invention should become apparent from the following detailed discussion, taken in conjunction with the accompanying drawing in which:

FIGURE 1 is a schematic representation of an embodiment of the apparatus of this invention. FIGURES 2a to 2e are graphical representations of operating features of the method of this invention. FIGURE 3 is a schematic representation of a modified form of control apparatus which can be employed in the apparatus of FIGURE 1.

Referring now to the drawing in detail and to FIGURE 1 in particular, there is shown a conventional chromatographic column 10 which is filled with a suitable packing material which is capable of selectively retarding passage therethrough of the individual constituents of a sample mixture. A carrier gas is introduced into the system through a conduit 11 which communicates with the inlet of a sample valve 12. A conduit 13 connects the outlet of sample valve 12 to the inlet of column 10. A conduit 14 extends between the outlet of column 10 and the first inlet of a dual channel differential detector 15. The output signal from detector 15 is applied to a recorder 16. A sample to be analyzed is introduced into the system through a conduit 18 which communicates with sample valve 12. Sample valve 12 is actuated by a programmer 17.

Figure 2B:
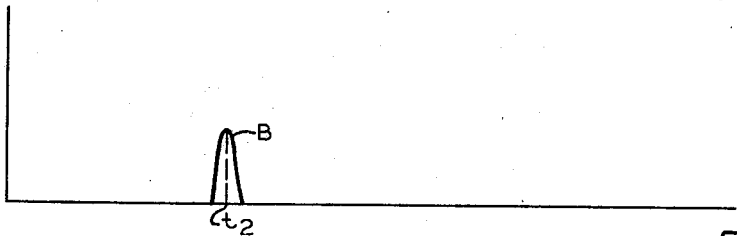
Figure 2C:
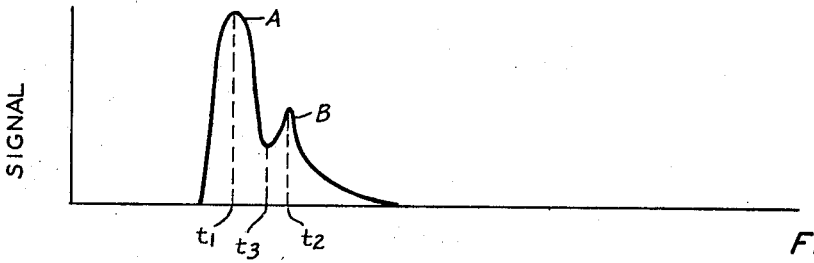

The apparatus thus far described constitutes a conventional chromatographic analyzer. Carrier gas initially flows through sample valve 12, column 10 and detector 15. This purges the column of any sample which may remain from a prior analysis and prepares the system for a new analysis. Programmer 17 actuates sample valve 12 so that a predetermined volume of the sample mixture is introduced into column 10. The carrier gas then continues to flow through the column to elute the constitutents of the sample in sequence from the column outlet. The presence of these constituents in the column effluent is measured by detector 15 and recorded by recorder 16. If the sample should contain only a single constituent A, a signal of the general type illustrated in FIGURE 2a would be received by recorder 16. As illustrated, this signal has a single peak, the maximum of which occurs at a time $t_1$. The trailing edge C of this peak normally reduces in amplitude exponentially generally as illustrated in FIGURE 2a. When a second component B which takes longer to pass through the chromatographic column 10 is considered alone, it would have a peak at time $t_2$, a bit later than time $t_1$, as shown in FIGURE 2b. However, if both constituents A and B are present in the sample, a curve of the type illustrated in FIGURE 2c is obtained. Since the second constituent B appears in time on the trailing edge of the first constituent A, a composite signal is obtained. In actual practice it is often extremely difficult to analyze curves of the type shown in FIGURE 2c, particularly when the second constitutent B is of relatively small magnitude so as to appear merely as a hump on the trailing edge of the first constituent A.

The system of this invention provides accurate resolution of the individual peaks in curves of the type illustrated in FIGURE 2c. This is accomplished by the use of differential detector 15 and the remainder of the apparatus illustrated in FIGURE 1. The output signals from the two channels of the detector are connected in opposition so as to provide a differential output. If the detector employs thermistors as the sensing elements, for example, the two sensing elements can be placed in adjacent arms of a Wheatstone bridge so that a differential output signal is obtained which represents the difference in composition of the two streams supplied to the detector. As an alternative, the detector can employ two flame ionization chambers having their outputs connected in electrical opposition. Any other type of differential detector can be employed in similar fashion. A portion of the carrier gas stream in conduit 11 is directed by conduit 20 in FIGURE 1 to the inlet of a second sample valve 21. The outlet of sample valve 21 is connected to the inlet of variable volume mixing vessel 22 which is provided with a stirrer 23 that is rotated by a motor 24. The outlet of vessel 22 is connected by a conduit 25 to the second inlet of detector 15. A conduit 19 extends between sample inlet conduit 18 and sample valve 21. Sample valve 21 is also controlled by programmer 17.

Figure 2D:
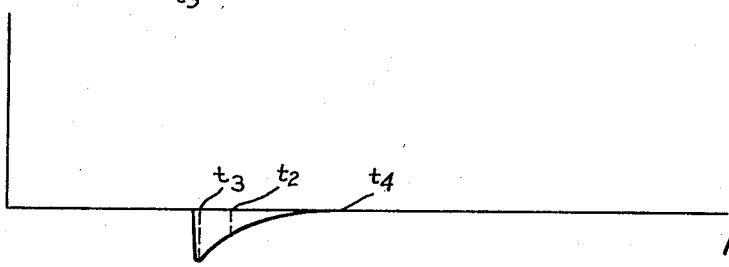
Figure 2E:
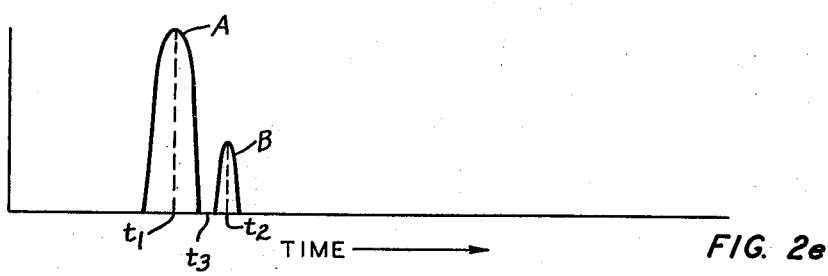

At the start of the analysis cycle, sample valve 21 is positioned so that carrier gas alone flows into mixing chamber 22 and from there to detector 15. Since only carrier gas flows through column 10 to the first channel of detector 15, the output signal of the detector is zero. Programmer 17 subsequently actuates sample valve 21 so as to introduce a predetermined volume of the sample material into mixing chamber 22 at a time $t_3$, which corresponds to the time that the curve of FIGURE 2a begins to decrease exponentially to zero. This sample is thoroughly mixed in chamber 22, and the resulting mixture of sample and carrier gas flows through a second channel of detector 15 as more carrier gas enters vessel 22. A signal of the type established solely by the second channel of the detector is illustrated in FIGURE 2d. It can be seen that a negative pulse appears initially and gradually diminishes exponentially to zero. This signal tends to cancel the trailing edge C of the signal of FIGURE 2a so that the signal resulting solely from constituent A drops rapidly to zero. Thus, the output signal of detector 15 is of the general configuration illustrated in FIGURE 2e. The peak resulting from the second minor constituent B no longer appears on the trailing edge of the major constituent peak A, and for this reason can more readily be identified.

Obviously adding the signal of FIGURE 2a to that of FIGURE 2b gives the signal of FIGURE 2c. Adding the signal of FIGURE 2c to the signal of FIGURE 2d gives the desired signal of FIGURE 2e. In FIGURE 2c the altitude of signal peak B has been raised above its true value in FIGURE 2b by the amplitude of C of FIGURE 2a at time $t_2$, but in FIGURE 2e this amplitude is corrected back to the correct amplitude of B of FIGURE 2b.

The concentration C of the sample which enters the reference side of the detector can be expressed mathematically by the following equation:

$$C = C_o e^{-\frac{Ft}{V}}$$

where C is the concentration (grams per cubic centimeter, for example), $C_0$ is the iniital concentration in grams per cubic centimeter of sample in chamber 22 immediately after sample valve 21 is actuated to introduce sample into chamber 22, F is the carrier gas flow rate in cubic centimeters per second through conduit 20, $t$ is seconds time of the exponential decay C from $t_3$ to $t_4$ of FIGURE 2a, V is the volume in cubic centimeters of mixing chamber 22 and $e$ is about 2.718, the base of the natural system of logarithms.

In the normal practice of this invention it is necessary to adjust the signal provided by the reference side of the detector in order to match the trailing edge of the primary constituent so that complete cancellation is obtained. This can readily be accomplished by first obtaining a conventional chromatogram using a uniform volume slug of a pure sample of the primary constituent supplied through the conventional sample valve 12, with sample valve 21 closed and only carrier gas 11 in branch 25 of detector 15. This produces the signal curve A of FIGURE 2a which has an exponentially-decaying trailing edge C. The next readings that are obtained are readings made in a similar manner with another pure component B giving the signal recorded in FIGURE 2b, and readings with the mixture of components of FIGURES 2a and 2b which gives the combined signal A, B of FIGURE 2c. Unfortunately, trailing edge C of FIGURE 2a has raised B in FIGURE 2c above its true value as shown in FIGURE 2b. The amount of sample compensating for C introduced into chamber 22 by valve 21, the time of introduction, and the volume of chamber 22 can then be adjusted until a reference signal is obtained which compensates for the trailing edge C of the primary constituent. From looking at signal curve A and C in FIGURE 2a it will be obvious that the time to introduce the compensating sample to remove trailing edge C is at time $t_3$. The amount of compensating sample to be used is that amount necessary to produce a negative amplitude at $t_3$ in FIGURE 2d equal to the positive amplitude of C at $t_3$ in FIGURE 2c. The entire system of FIGURE 1 is then employed using as the sample in line 18 the mixture of components to be analyzed that will produce signal peaks A and B. The carrier gas rate in line 13 is that conventional for chromatographic analysis. From a study of the signal A, C in FIGURE 2a, the time of exponential decay to a negligable value of the entire length of C from $t_3$ to $t_4$ is obtained. This value of $t$ is placed in the above formula. The flow rate F and volume V are then selected so that the exponent $-Ft/V$ will have a value which makes the concentration C become negligable at $t_4$. Then a test run is made and the signal is compared to FIGURE 2e. If the signal returns to the base line between peaks A and B, as in that figure, all is adjusted. If it does not return to the base line between peaks, the amount of initial concentration $C_0$ should be increased, and if goes below the base line between peaks the initial concentration should be decreased. Anyone skilled in the art of operating chromatographic columns can easily adjust the amount of sample entering as a slug through valve 21 to get the desired initial concentrations $C_0$ with any given flow rate F and volume V to give the desired signal curve of FIGURE 2e with the curve returning exactly to the base line between peaks A and B as shown. An operator skilled in the art can make this adjustment in about three runs or less, and once the adjustment is made the machine can make hundreds of runs automatically without further adjustment provided the runs are analyzing a mixture of about the same amounts of the same components, as is true in applying this analysis to control of a process in commercial operations. In order that these adjustments can readily be made, mixing chamber 22 can be provided with a movable piston 26 which forms one wall to permit the volume to be changed. If a conventional sample valve is used as valve 21, loops of different size can be provided to permit adjustment of the volume of sample introduced. Valves 12 and 21 can be any suitable valves for introducing pre-selected amounts of sample. Examples of such valves are described in U.S. Patents 3,171,274 and 3,111,849. Programmer 17 can be any suitable device for actuating valves 12 and 21 at preselected times, such as a programmer of the type described in U.S. Patent 3,069,894, for example.

As a specific example of the use of the analyzer of this invention, acetylene can be detected in an ethylene stream in relatively small concentrations, less than 1% for example. Helium can be employed as the carrier gas. The trailing edge of the major ethylene peak is balanced out by introducing a sample of the test material into chamber 22.

The description thus far presented has involved the use of sample material as the reference material supplied to chamber 22. However, other materials can be employed for this purpose. The only requirement is that the reference material provide a "negative" output signal when supplied to the reference side of detector 15.

Programmer 17 is adjusted in FIGURE 1 to introduce the reference material into chamber 22 at the appropriate time to balance the trailing edge of the first peak. FIGURE 3 illustrates alternative equipment which can be employed for this purpose. The indicator of recorder 16a is provided with an arm 30 that is adapted to close a switch 31 when recorder 16a receives a signal of preselected magnitude. For example, switch 31 can be closed when the peak of curve A of FIGURE 2a reaches a preselected magnitude. Closure of switch 31 actuates a relay 32 which is connected to a current source 33 by switch 31. Relay 32 in turn actuates sample valve 21. Relay 32 can be an adjustable time delay relay to permit adjustment of the time of introduction of the reference material to chamber 22.

While this invention has been described in conjunction with presently preferred embodiments, it obviously is not limited thereto.

What is claimed is:

1. A method of analyzing a material that contains at least two constituents, which method comprises introducing a sample of such material into a chromatographic column, eluting the constituents of said sample in sequence from the column by passing a carrier gas through the column, passing the effluent from the column through the first channel of a differential analyzer, positioning a reference material in a vessel, rapidly and thoroughly mixing the reference material with the carrier gas in said vessel before allowing the mixture to pass from said vessel, passing carrier gas through said vessel at a predetermined time with respect to the time of emergence of one of said constituents from said column, whereby the effluent from said vessel contains said reference material in progressively smaller concentrations at progressively later times following said predetermined time, and passing the effluent from said vessel to the second channel of said analyzer.

2. The method of claim 1 wherein said reference material is a portion of the material to be analyzed.

3. The method of claim 1 wherein the material to be analyzed comprises a fluid mixture containing ethylene and acetylene, the ethylene being present in substantially greater concentration than the acetylene, and wherein the carrier gas is helium.

4. Analysis apparatus comprising a chromatographic column having an inlet and an outlet, a differential analyzer adapted to receive two samples and provide an output signal representative of differences in composition therebetween, means to introduce a carrier gas into the inlet of said column, means to introduce a sample of material to be analyzed into the inlet of said column, first conduit means communicating between the outlet of said column and one inlet of said analyzer, a mixing vessel, means to introduce a carrier gas into said vessel, means to introduce a reference material into said vessel, and second conduit means communicating between an outlet of said vessel and the second inlet of said analyzer.

5. The apparatus of claim 4 wherein said mixing vessel is of adjustable volume and is provided with stirring means to mix reference material and carrier gas.

6. The apparatus of claim 4 wherein said means to introduce a sample of material to be analyzed into the inlet of said column comprises a first sample valve in said means to introduce carrier gas into said column, said means to introduce reference material into said vessel comprising a second sample valve in said means to introduce carrier gas into said vessel, and further comprising a programmer to actuate said first and second sample valves selectively at predetermined times.

7. The apparatus of claim 6, further comprising inlet conduit means to introduce material to be analyzed into said first and second sample valves from a common source.

8. The apparatus of claim 4, further comprising means responsive to the output signal of said analyzer to actuate said means to introduce a reference material into said vessel when the output signal of said analyzer reaches a preselected magnitude.

References Cited

UNITED STATES PATENTS

| | | | |
|---|---|---|---|
| 3,375,701 | 4/1968 | Arksey | 73—23.1 |
| 3,405,550 | 10/1968 | Bloch | 73—23.1 |

RICHARD C. QUEISSER, Primary Examiner

C. E. SNEE, Assistant Examiner